R. J. GOULD.
Valve-Guides.
No. 142,458. Patented September 2, 1873.
Fig. 1.
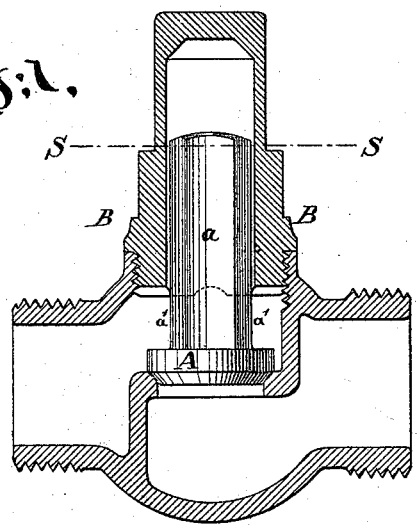
Fig. 2.
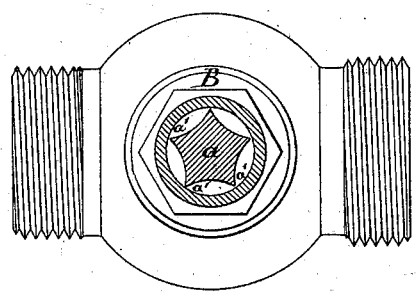
Fig. 3.     Fig. 4.     Fig. 5.     Fig. 6.
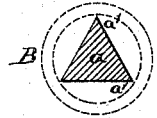  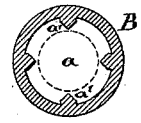 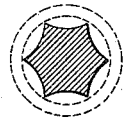
Witnesses:          Inventor:
Arnold Hormann         R. J. Gould
Wm C. Dey            by his attorney J. S. Stetson

UNITED STATES PATENT OFFICE.

ROSCOE J. GOULD, OF NEWARK, NEW JERSEY.

IMPROVEMENT IN VALVE-GUIDES.

Specification forming part of Letters Patent No. 142,458, dated September 2, 1873; application filed June 30, 1873.

*To all whom it may concern:*

Be it known that I, ROSCOE J. GOULD, of Newark, Essex county, in the State of New Jersey, have invented certain Improvements relating to Valve-Guides, of which the following is a specification:

The invention avoids the liability, heretofore serious, that the valve may become stuck in a permanently open condition in consequence of an accumulation of grit or other foreign matter between the stem or guide and the adjacent fixed surface.

I have formed the valve-stem with angular projections, presenting but a small surface against the adjacent parts, or nearly the same advantages may be secured by making the fixed surfaces with corresponding angular projections inward to guide the smoothly-turned stem.

The following is a description of what I consider the best means of carrying out the invention.

The accompanying drawings form a part of this specification.

Figure 1 is a central vertical section through a check-valve with my invention. Fig. 2 is a horizontal section on the line *s s*.

The additional figures represent different modifications in horizontal section.

Similar letters of reference indicate corresponding parts in all the figures.

A is the valve, and *a* is the stem. The latter, instead of being cylindrical or presenting any widely-extended surface, is deeply fluted, and presents, in contact with the inclosing metal B, the slant angles *a'*.

Some portion of the benefit due to the invention may be realized by making the stem smooth and cylindrical, and forming the inclosing metal with internal ridges narrowed by filing or otherwise, as indicated in Fig. 5.

In case there are wings formed below the body A their peripheries or exterior surfaces are correspondingly narrow, so as to bear only on narrow edges.

It has been common to provide water-ways for the ready flow of water up and down past the stem; but the large surfaces remaining in contact were liable to catch and retain matters which would clog the motion of the valve. This was an especially serious evil in working very dirty water, and water containing particles of stone or coal. Steam fire-engines have from this cause blown the water out of their boilers and become suddenly inoperative at crises when their importance could be hardly estimated in dollars and cents. My invention renders clogging from this cause almost impossible with any kind of water.

I have tested the invention successfully on severely-worked steam fire-engines in the forms shown in Figs. 1 and 2.

I claim as my invention—

The construction of the valve-stem or the adjacent surface with angular ridges or knife-edges to form the guiding contact, so as to avoid the chance of retaining sand or other foreign matter, as herein specified.

In testimony whereof I have hereunto set my hand this 27th day June, 1873, in the presence of two subscribing witnesses.

ROSCOE J. GOULD.

Witnesses:
WM. C. DEY,
ARNOLD HÖRMANN.